Oct. 10, 1944.    A. GORDON    2,359,985
FILTER
Filed Oct. 30, 1940    2 Sheets-Sheet 1

Inventor:
Arthur Gordon
BY:
Rasmussen and Brugman
Attys.

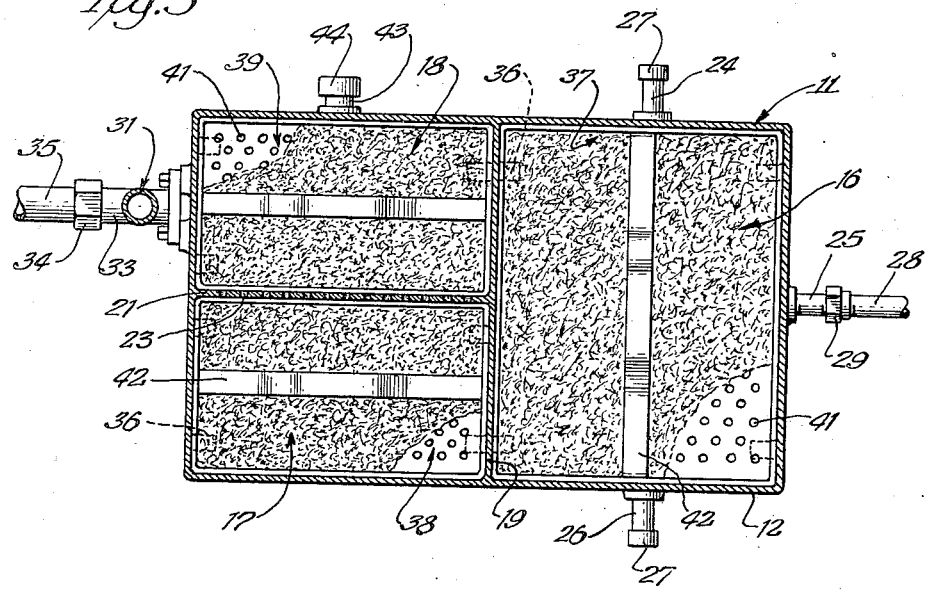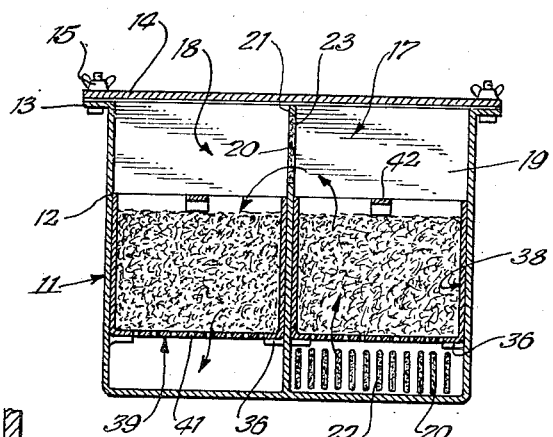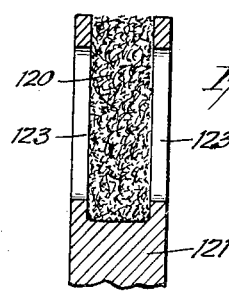

Patented Oct. 10, 1944

2,359,985

UNITED STATES PATENT OFFICE 2,359,985

FILTER

Arthur Gordon, Chicago, Ill.

Application October 30, 1940, Serial No. 363,453

2 Claims. (Cl. 210—134)

This invention relates in general to filters, and more particularly to improvements in apparatus for filtering any desired type of fluid.

A principal object of the invention is the provision of a simplified filtering unit employing a filter medium containing receptacle or receptacles which may readily be removed therefrom for cleaning or replacement.

Another important object of the invention is the provision of a filtering unit which is so constructed and arranged as to enable the selective use of one or more removable containers having different types or combinations of filtering mediums therein, whereby the unit may be effectively employed under any desired service conditions.

A further important object of the invention is the provision in such a filtering unit of means for properly guiding the flow of fluid therethrough to insure it passing serially or successively through the different filtering mediums that may be employed.

Another object of the invention is the provision in such a filtering unit of a plurality of variously located inlet and outlet connections which are adapted to be selectively and optionally used to meet the requirements of any particular installation of the unit.

Numerous other objects and advantages of the invention will be apparent as it is better understood from the following description, which, when taken in connection with the accompanying drawings, discloses a preferred embodiment thereof.

In the drawings,

Fig. 3 is a horizontal plan view taken substantially on the line 3—3 of Fig. 2;

Figure 4 is a section taken along the line 4—4 of Figure 2; and

Figs. 5 and 6 are enlarged detail vertical sections of portions of modified interior wall structures.

Figure 1:
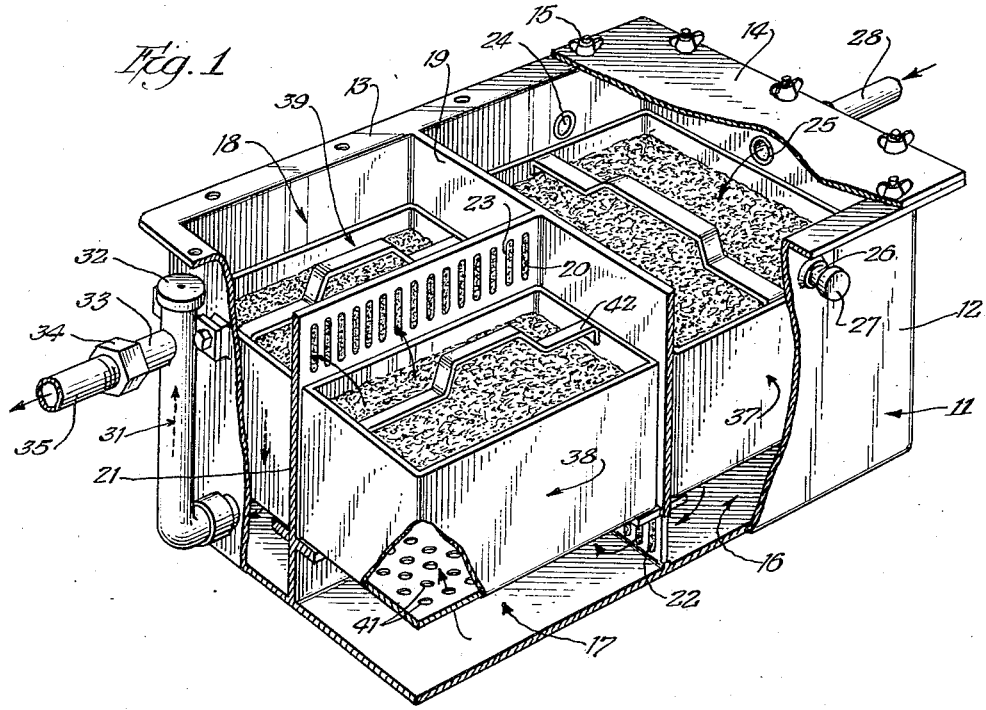
Figure 1 is a perspective view of a device embodying the invention, with parts broken away to show the interior construction thereof.

Referring more particularly to the drawings, reference numeral 11 indicates in general a filter unit embodying the features of the invention and comprising a main casing 12 which is preferably cast as a unitary member from any suitable material, is open at the upper end, and is provided adjacent thereto with an outwardly extending, marginal flange 13. A cover member 14 is removably mounted upon the casing 12 and is secured to the flange 13 by suitable wing nuts and bolts 15. In order to insure a leak-proof connection, a gasket of any suitable material is disposed between the flange 13 and the removable cover member 14.

Figure 2:
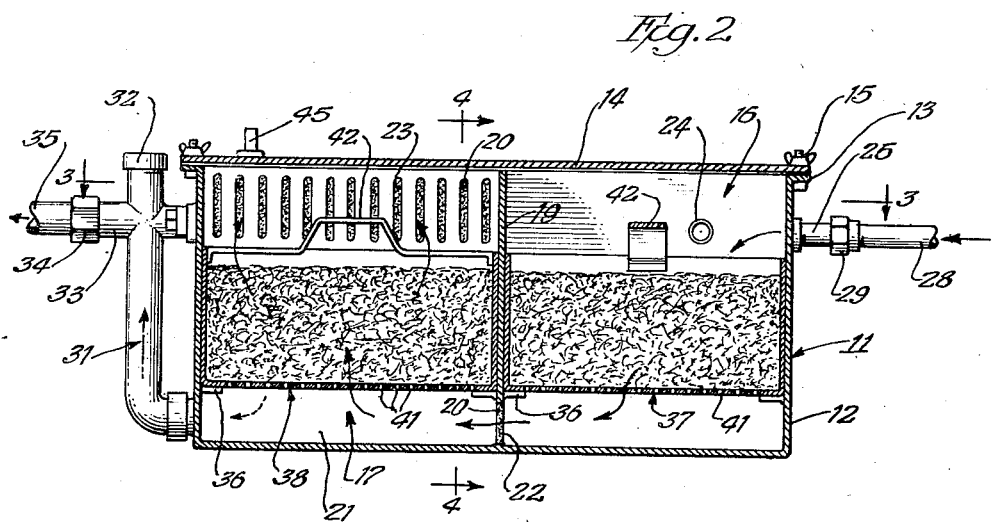
Fig. 2 is a vertical section taken longitudinally through the device of Fig. 1.

The interior of the casing 12 is divided into three compartments, namely, an inlet compartment 16, an intermediate compartment 17 and an outlet compartment 18, by flow controlling means or walls 19 and 21, as will be seen best from Figs. 1 and 3. These wall structures 19 and 21 extend vertically for the full depth of casing 12, and are preferably formed integrally therewith in the casting of the casing. The wall 19 extends transversely across the casing 12 to divide the same substantially in half, while the wall 21 extends between the wall 19 and one end of the casing. At its lower end, half of the wall 19 is provided with a plurality of laterally spaced, vertically disposed apertures 22 (Figs. 1, 2 and 4) which extend upwardly for a relatively short distance from the bottom of the casing 12 to provide communication between the inlet compartment 16 and the intermediate compartment 17. The upper portion of the wall 21 is provided with similar apertures 23 which communicate between the intermediate compartment 17 and the outlet compartment 18. The apertures 22 and 23 are preferably filled with some suitable relatively fine filtering material 20, such as glass wool, or the like.

Adjacent the upper end of the casing 12, the inlet compartment 16 is provided with three inlet connections 24, 25 and 26, which are disposed respectively on the three outer walls of the inlet compartment. Two of these inlet connections, shown as 24 and 26 in the drawings, will normally be closed by means of suitable cap members 27. The third inlet connection 25 is connected to any desired supply pipe 28 by means of a union 29. The several inlet connections are provided for selective or optional use to meet the requirements of any particular installation of the filter unit 11, as will be described more fully hereinafter.

The outlet compartment 18 is provided, and preferably on the outer end wall thereof, with an outlet connection 31 comprising a vertically disposed pipe communicating at its lower end with the interior of the outlet compartment adjacent the bottom thereof. The upper end of this pipe is preferably closed by a suitable cap member 32 (Figs. 1 and 2) which may be vented to the atmosphere, if necessary. A horizontally disposed pipe 33 extends outwardly from and is preferably formed integrally with the vertically disposed pipe of the outlet connection 31 which, together with the lower ends of the apertures 23 in the wall 21, will determine the normal liquid level within the unit 11, if liquid is disposed therein. The outer end of the pipe 33 is exteriorly threaded to receive a standard union 34 for connecting the same to an outlet pipe 35.

On each side of the wall 19 and the inner sides of the end walls of the casing 12 are provided a plurality of suitably spaced, horizontally disposed lugs 36 extending into the several compartments of the casing a short distance above the upper ends of the apertures 22 in the wall 19. The lugs 36 comprise supporting flanges or shoulders for a plurality of filter medium containing receptacles, indicated generally by reference numerals 37, 38 and 39, removably disposed within the several compartments 16, 17 and 18, respectively. Each of the receptacles 37, 38 and 39 is slidably disposed vertically within its respective compartment 16, 17 and 18.

Each of the receptacles 37, 38 and 39 is open at its top and includes a bottom portion having suitable apertures 41 extending therethrough of any desired shape, size and relative spacing. Extending across the upper portions of each of the receptacles 37, 38 and 39 is a handle member 42 to facilitate removal from and insertion into the container 12. Each of these receptacles comprises a filtering unit which is substantially filled with such filtering medium or combinations thereof as may be deemed necessary to accomplish the desired results in any particular installation. For example, the same filtering medium may be disposed in each of the receptacles, with that in the receptacle 37 being coarser or more porous than that in the receptacle 38, and that in the receptacle 39 being still finer or less porous. On the other hand, the different receptacles 37, 38 and 39 may contain different combinations of various filtering mediums, such as sand, gravel, charcoal, crushed limestone, porous membranes, fine-mesh metal screens, or the like.

In the operation of the filter unit 11, the fluid to be filtered is introduced into the inlet compartment 16 through any desired one or ones of the several inlet connections 24, 25, 26, and flows downwardly through the filtering medium or mediums contained in the first receptacle 37. From there, it flows through the apertures 22 and filtering material 20 therein into the intermediate compartment 17 and up through the filtering medium or mediums contained in the receptacle 38. When the intermediate compartment has been filled, the fluid being filtered will flow through the apertures 23 in the wall 21 and the filtering material 20 therein into the outlet compartment 18, through the filtering unit 39, and out the outlet connection 31 and discharge pipe 35. This path of flow through the unit 11 is indicated by the small arrows in Figs. 1, 2 and 4.

For different types of fluids and in order to remove various kinds of foreign material therefrom not only different types and combinations of filtering mediums may be employed, but one or more of the receptacles 37, 38 or 39 may be entirely removed from the casing 12. For example, if the receptacles 37 and 38 were both removed from the casing 12, the fluid introduced into the inlet compartment 16 would flow therefrom through the apertures 22 into the intermediate compartment 17. After the liquid level rises in these two compartments to the lower ends of the apertures 23 in the wall 21, if the fluid introduced into the filtering unit is a liquid, it would then flow through the apertures 23, and the filtering medium in the receptacle 39, to the outlet connection. In this respect, it should be pointed out that the outlet connection from the filter unit 11 may extend directly outwardly therefrom at a point adjacent the bottom of the casing, as shown in Fig. 3 by the optional outlet connection 43. In the present embodiment illustrated in the drawings this optional discharge connection 43 is closed by a suitable cap member 44. When arranged as described, the use of this outlet connection 43 will result in the filtering unit 39 not being submerged in the liquid being filtered, as is the case when the outlet connection 31 is employed. The provision of the differently located inlet and outlet connections on the casing 12 also has the advantage of enabling those particular connections to be used which best suit the circumstances of any given installation.

As fluid is first introduced into the filter unit 11 and in the flow of liquid therethrough, an air pocket may be formed in the upper part of the outlet compartment 18. A suitable air vent 45 is provided on the cover member 14, which may be in the form of an ordinary check valve, to take care of any air pockets which may form in the filter unit.

Figs. 5 and 6 show modifications of the interior wall 19 and 21, respectively, which are constructed to facilitate the placing and removal for cleaning or replacement of filtering material similar to the material 20 hereinbefore described. Reference numeral 119 indicates a double wall, or parallel walls having a space therebetween, which may be substituted for the transverse wall 19. Adjacent the lower end, this wall structure 119 is provided with apertures 122 which are similar in all respects to the apertures 22. Instead of filling the apertures 122 with filtering material 20, however, a block of glass wool 120, or other suitable filtering material, is disposed between the parallel walls 119, as shown in Fig. 5. A similar block of filtering material 120 is placed in the longitudinal recess provided in the upper portion of the wall 121 (Fig. 6) which may be substituted for the wall 21 and has apertures 123 similar to the apertures 23.

From the above description, it will be readily apparent that the filter unit 11 may be used in filtering liquids and gases of all kinds. The ready removability of the several filtering medium containing receptacles 37, 38, 39 greatly facilitates the adaptation of the one unit to any desired one of innumerable uses. The particular importance of the ready removability of these separate filtering medium containers lies in the fact that it enables the filtering medium or mediums to be cleaned or replaced with a minimum amount of effort.

It is to be noted that the lugs 36 space the receptacles 37, 38 and 39 from the bottom of the casing so that heavy sediment can collect on the bottom of the casing where it will not unnecessarily clog the filters. When the receptacles are removed, this sediment may easily be cleaned out of the casing.

It is to be noted that one of the important features of the invention is that the receptacles 38 and 39 are interchangeable so that the flow of liquid through them may be reversed for cleaning purposes.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a device of the class described, a casing open at its upper end, a first wall member extending transversely across said casing to define one side of an inlet compartment, a second wall member extending longitudinally from said first wall member to divide the remainder of said casing into an intermediate and an outlet compartment, said first wall member having apertures adjacent the bottom thereof to provide communication between said inlet and intermediate compartments, said second wall member having apertures adjacent the top thereof to provide communication between said intermediate and outlet compartments, inlet and outlet connections communicating respectively with said inlet and outlet compartments, a cover member removably secured to said casing, and a filter medium containing receptacle removably mounted in each compartment and spaced from the bottom of said casing.

2. A device as claimed in claim 1, in which at least two of the receptacles are interchangeable.

ARTHUR GORDON.